(12) United States Patent
MacGougan et al.

(10) Patent No.: US 10,171,946 B2
(45) Date of Patent: Jan. 1, 2019

(54) ASSISTED GNSS VELOCITY ESTIMATION

(71) Applicant: Apple Inc., Cupertino, CA (US)

(72) Inventors: Glenn Donald MacGougan, San Jose, CA (US); Changlin Ma, Cupertino, CA (US); Kumar Gaurav Chhokra, San Jose, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,133

(22) Filed: Sep. 23, 2016

(65) Prior Publication Data

US 2017/0347239 A1 Nov. 30, 2017

Related U.S. Application Data

(60) Provisional application No. 62/342,171, filed on May 26, 2016.

(51) Int. Cl.
*H04W 4/02* (2018.01)
*H04B 1/3827* (2015.01)
*H04W 4/029* (2018.01)

(52) U.S. Cl.
CPC ............ *H04W 4/027* (2013.01); *H04B 1/385* (2013.01); *H04W 4/029* (2018.02)

(58) Field of Classification Search
CPC ...... H03M 7/30; A61B 5/1112; A61B 5/7232; G01C 22/006

USPC ...................... 455/456.1, 456.2, 456.3, 456.6
See application file for complete search history.

(56) References Cited

U.S. PATENT DOCUMENTS

| | | | |
|---|---|---|---|
| 8,212,720 B2 | 7/2012 | Waters et al. | |
| 2013/0090881 A1 | 4/2013 | Janardhanan et al. | |
| 2013/0288718 A1* | 10/2013 | MacGougan | H04W 52/0254 |
| | | | 455/456.4 |
| 2014/0046990 A1* | 2/2014 | Kmiecik | A61B 5/1112 |
| | | | 708/203 |
| 2014/0288822 A1* | 9/2014 | Morrison | G01S 19/23 |
| | | | 701/466 |
| 2015/0328516 A1 | 11/2015 | Coza et al. | |
| 2016/0334433 A1* | 11/2016 | Kazemi | G01C 22/006 |

* cited by examiner

*Primary Examiner* — Congvan Tran
(74) *Attorney, Agent, or Firm* — Fish & Richardson P.C.

(57) ABSTRACT

Systems, methods, devices and computer-readable storage mediums are disclosed for assisted GNSS velocity estimation. In an implementation, a method comprises: obtaining, by a mobile device, a step-based speed measurement based on sensor data; obtaining, by the mobile device, a step-based speed uncertainty associated with the step-based speed measurement; determining, by the mobile device, that one or more assistance conditions are met; responsive to the determining, assisting a state estimator using the step-based speed measurement and the associated step-based speed uncertainty; and estimating at least one of the position, velocity or speed of the mobile device using the assisted state estimator.

24 Claims, 4 Drawing Sheets

ASSISTED GNSS VELOCITY ESTIMATION

CROSS-REFERENCE TO RELATED APPLICATION

This application claims priority to U.S. Provisional Patent Application No. 62/342,171, filed May 26, 2016, the entire contents of which are incorporated herein by reference.

TECHNICAL FIELD

This disclosure relates generally to device state estimation.

BACKGROUND

A fitness application running on mobile device that includes a global navigation satellite system (GNSS) receiver can use GNSS speed and estimated stride length to determine a distance traveled by a user carrying or wearing the mobile device. In some cases, GNSS speed estimates can be lower than the actual speed of the user due to the location of the mobile device on the user's body. For example, if the mobile device is located on the small of the user's back (e.g., stored in a running belt), line-of-sight GNSS signals are obscured by the user's body. Because line-of-sight GNSS signals are blocked by the user's body, the GNSS receiver tracks GNSS signal reflections. Tracking GNSS signal reflections results in lower GNSS speed estimates, which results in less accurate distance traveled calculations.

SUMMARY

Systems, methods, devices and non-transitory, computer-readable storage mediums are disclosed for assisted GNSS velocity estimation. In some implementations, a method comprises: obtaining, by a mobile device, a step-based speed measurement based on sensor data; obtaining, by the mobile device, a step-based speed uncertainty associated with the step-based speed measurement; determining, by the mobile device, that one or more assistance conditions are met; responsive to the determining, assisting a state estimator using the step-based speed measurement and the associated step-based speed uncertainty; and estimating at least one of the position, velocity or speed of the mobile device using the assisted state estimator.

In some implementations, a mobile device comprises: one or more sensors; one or more processors; memory coupled to the one or more processors and configured to store instructions, which, when executed by the one or more processors, causes the one or more processors to perform operations comprising: obtaining a step-based speed measurement based on sensor data; obtaining a step-based speed uncertainty associated with the step-based speed measurement; determining that one or more assistance conditions are met; responsive to the determining, assisting a state estimator using the step-based speed measurement and the associated step-based speed uncertainty; and estimating at least one of the position, velocity or speed of the mobile device using the assisted state estimator.

Particular implementations disclosed herein provide one or more of the following advantages. To improve GNSS velocity estimation, the disclosed implementations assist a tightly-coupled state estimator with step-based speed measurements provided by, for example, a digital pedometer. A number of assistance conditions are checked to ensure that the step-based speed measurement is a good and independent observation. If a number of assistance conditions are met, the step-based speed measurement is input into the state estimator as a measurement update, resulting in an improved GNSS velocity estimate. The disclosed implementations are beneficial for use cases in which a user is using a display of a wearable device (e.g., a watch) to read data (e.g., distance traveled by the user, turn-by-turn directions), while a companion device (e.g., a smart phone) that includes a GNSS receiver and is coupled (wirelessly or wired) to the wearable device is stored in a location where line-of-sight GNSS signals are obscured (e.g., stored in a running belt).

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
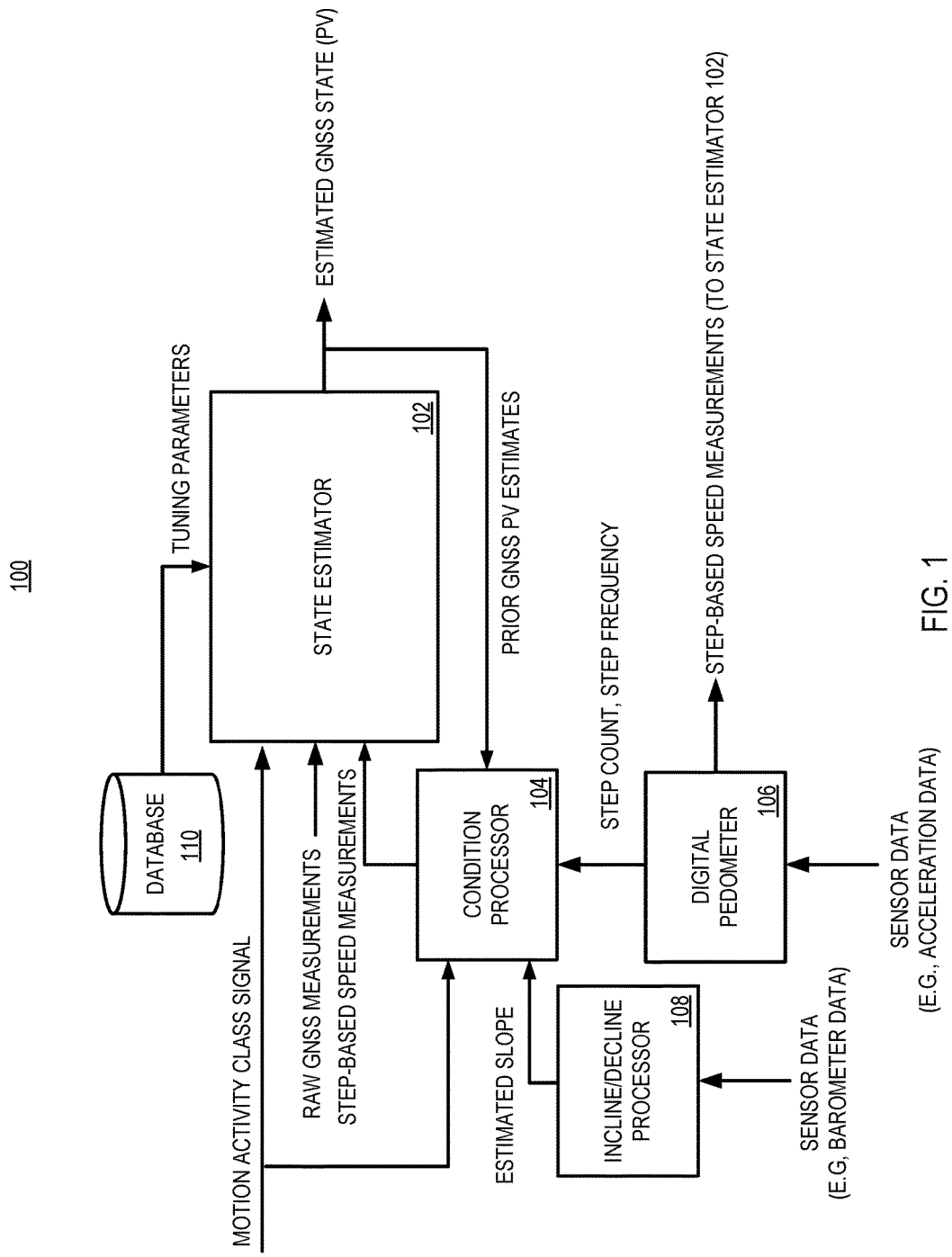
FIG. 1 is a block diagram of an example system for assisted GNSS velocity estimation, according to an implementation.

FIG. 1 is a block diagram of an example system for assisted GNSS velocity estimation, according to an implementation. In this example implementation, system 100 can include state estimator 102, condition processor 104, digital pedometer 106, incline/decline processor 108 and tuning parameter database 110. System 100 can be implemented by, for example, a mobile device using architecture 400, as described in reference to FIG. 4. Mobile devices can include but are not limited to smart phones, activity trackers and wearable devices (e.g., watch computer, fitness bracelets, optical head-mounted display).

State estimator 102 is configured to determine an estimated GNSS state that includes estimated position and velocity (PV). Other states can also be estimated by state estimator 102. In some implementations, state estimator 102 receives as inputs raw GNSS data (e.g., pseudorange, delta pseudorange), a motion activity class signal and raw step-based speed measurements (e.g., pedometer speed measurements).

In some implementations, the raw GNSS data can be provided by a GNSS receiver. The GNSS can be, for example, a Global Positioning System (GPS). The motion activity class signal can be generated based on sensor data (e.g., acceleration pattern recognition) and include one or more bits or flags that indicate a motion activity class. Some examples of motion activity classes include but are not limited to: stationary, walking, running, cycling and driving. The motion activity class signal can be used to tune various bandwidth (BW) parameters of state estimator 102 (e.g., process noise) using tuning parameters stored in database 110.

In some implementations, raw step-based speed measurements can be generated by pedometer 106 based on sensor data (e.g., accelerometer, rate gyro sensor data). The raw step-based speed measurements can be used with raw GNSS position and velocity or speed data to update state estimator 102 to improve the GNSS speed estimate when mostly reflective GNSS signals are received by the GNSS receiver, such as occurs when the user's body prevents line-of-sight GNSS signals from reaching the GNSS receiver.

To assist state estimator 102, a number of assistance conditions are checked by condition processor 104 to ensure that the raw step-based speed measurement is a good and independent observation. The conditions can be checked by condition processor 104 in any desired order or in parallel. In some implementations, all conditions need be checked and passed before step-based speed assistance is provided to state estimator 102. In other implementations, fewer than all conditions need be checked and passed before step-based speed assistance is provided to state estimator 102. Each condition will now be described in turn.

Example Filter Conditions

For a first condition, condition processor 104 determines if the raw step counts provided by digital pedometer 106 occur on a regular interval (e.g., every 2.56 seconds). If the first condition fails, step-based speed assistance is not provided to state estimator 102. If the first condition passes, a second condition is checked.

For the second condition, condition processor 104 determines if the step frequency is relatively constant over a window of step observation time (e.g., 12.8 seconds). If the second condition fails, step-based speed assistance is not provided to state estimator 102. If the second condition passes, a third condition is checked.

For the third condition, condition processor 104 determines if the user is running on an incline or decline (e.g., running up or down a hill or inclined treadmill) based on data provided by incline/decline module 108. For example, a slope can be estimated using linear regression applied to a window of sampled barometer data. The window of barometer samples can be larger than the window of step observation time. If the absolute value of the slope of the line fitted to the barometer data exceeds a threshold value, then step-based speed assistance is not provided to state estimator 102. If the third condition passes, a fourth condition is checked.

For the fourth condition, condition processor 104 determines if a prior GNSS speed estimate (e.g., stored in memory by state estimator 102) is higher than the raw step-based speed measurement provided by digital pedometer 106. If the GNSS speed estimate is higher than the raw step-based speed measurement, then step-based speed assistance is not provided to state estimator 102. State estimator 102 will tend to underestimate GNSS speed for the example problem case (e.g., a mobile device stored in a running belt). The step-based speed assistance is limited to periods when state estimator 102 is likely to be underestimating GNSS speed. If the fourth condition passes, a fifth condition can be checked.

For the fifth condition, condition processor 104 monitors the motion activity class signal. If the motion activity class signal indicates that the user is not running, then step-based speed assistance is not provided to state estimator 102. The problem cases due to reflected GNSS signals are more pronounced in the running motion activity class so, in some implementations, the step-based speed assistance is limited to the running motion activity class. If the fifth condition passes, a sixth condition can be checked.

For the sixth condition, condition processor 104 determines if the raw step-based speed is outside of an acceptable speed for a human who is running (e.g., the raw step-based speed falls between 2.0-6.7 m/s). If the raw step-based speed falls outside the acceptable speed range, then the step-based assistance is not provided to state estimator 102. If the sixth condition passes, a seventh condition can be checked.

For the seventh condition, condition processor 104 determines if the user is running in-place on, for example, a tread mill by determining if there is insufficient GNSS delta distance over the window of step observation time. An estimate of delta distance can be calculated directly by state estimator 102 or calculated from an estimated GNSS position (e.g., a difference in position estimates or velocity measurements over time) provided by state estimator 102. If there is insufficient delta distance, then the step-based assistance is not provided to state estimator 102. If the seventh condition passes, the step-based assistance can be provided to state estimator 102.

State estimator 102 uses the step-based measurement together with raw GNSS position and velocity/speed data (e.g., pseudorange, delta pseudorange) to estimate GNSS position and velocity/speed. The estimated position and velocity can then be used in a variety of applications.

For example, a fitness application running on the mobile device may use the estimated GNSS speed to compute a more accurate distance traveled in use cases where a GNSS receiver is receiving reflective signals. A mapping or navigation application may use the GNSS estimated position and velocity/speed to provide a route or turn-by-turn directions on a display of the mobile device to improve a navigation application. Location based services application can use the GNSS estimated position and velocity/speed to deliver location based services to the mobile device. In addition to these improvements in applications, the disclosed implementations improve a GNSS receiver by enabling the GNSS receiver to provide more accurate estimates of position and velocity/speed.

Example Modeling of Measurement Uncertainty

Figure 2:
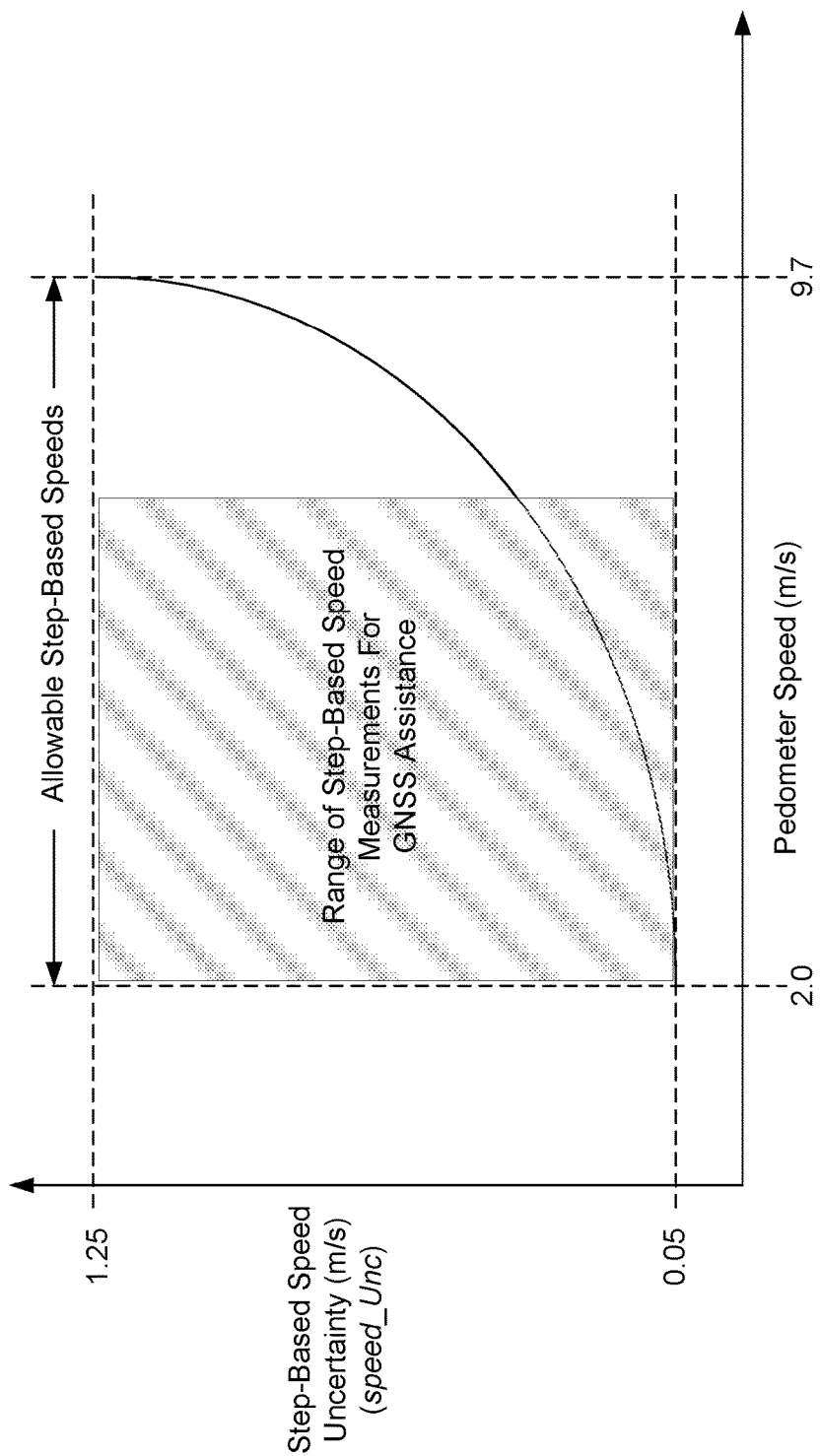
FIG. 2 is a plot illustrating pedometer speed uncertainty as a function of pedometer speed, according to an implementation.

FIG. 2 is a plot illustrating pedometer speed uncertainty as a function of pedometer speed, according to an implementation. Step-based speed estimation will be potentially biased with performance a function of how well stride length is estimated. Step-based speed assistance to GNSS is most useful at lower running speeds with a high likely-hood of benefiting the accuracy of the GNSS velocity estimate. At higher speeds, there is a potential to negatively affect the accuracy of the GNSS velocity estimate by over estimating speed. When the step-based speed is passed to GNSS estimator 102 the estimate includes an uncertainty estimate speedUnc. To make good use of the step-based speed assistance, the step-based speed uncertainty speedUnc is modeled based on the plot in FIG. 2 using a quadratic function of the step-based speed $speed_{step}$ given by:

$$speedUnc = A*(speed_{step} - B)^2 + C, \qquad [1]$$

where, for example, A=0.0125, B=7.2 kph and C=0.05 m/s.

Given the example constants A, B and C, Equation [1] results in a speed uncertainty (1-sigma, 67% probability region) of 0.05 m/s at 7.2 kph and 1.02 m/s at 16 kph. By using a step-based speed measurement and an associated speedUnc in a state estimator to estimate GNSS position and velocity, the problematic GNSS velocity under reporting problem is greatly improved while not unduly biasing the GNSS velocity estimate toward high speeds. In some implementations, the step-based speed assistance is provided if the conditions above are met at the same interval as the step count interval (e.g., 2.56 seconds) discussed above.

Example GNSS State Estimation

In some implementations, state estimator 102 is implemented by an extended Kalman filter as described below. Other implementations are also possible, including but not limited implementations that use a maximum likelihood estimator, Bayes estimator, minimum means squared error (MMSE), weighted least squares (WLS) estimator or particle filter. Equations [2]-[6] below describe an example extended Kalman filter formulation for state estimator 102.

State Prediction

The state prediction equation is given by $$\hat{x}_{k|k-1} = \Phi_k \hat{x}_{k-1|k-1},  \quad [2]$$

where $\hat{x}_{k|k-1} = [\hat{x}_{k|k-1}, \hat{\dot{x}}_{k|k-1}]$ is a two-element state vector, $\hat{x}_{k|k-1}$ is the predicted (a prior) GNSS position estimate, $\hat{\dot{x}}_{k|k-1}$ is the predicted (a prior) GNSS velocity/speed estimate and $$\Phi = \begin{bmatrix} 1 & \Delta t \\ 0 & 1 \end{bmatrix}$$

is a 4 element state transition matrix.

Covariance Prediction

The predicted (a prior) error covariance estimate is given by $$P_{k|k-1} = \Phi_k P_{k-1|k-1} \Phi_k^T + Q_k, \quad [3]$$

$$P = \begin{bmatrix} p_0 & p_2 \\ p_2 & p_1 \end{bmatrix},$$

$$Q = \begin{bmatrix} q_0 & 0 \\ 0 & q_1 \end{bmatrix},$$

where $q_0$, $q_1$ is process noise, $\Delta t$ is a time step and the diagonal elements $p_0$ and $p_1$ are initialized with integer values that can be determined empirically.

Kalman Gain

The equation for Kalman gain is given by $$K_k = P_{k|k-1} H_k^T (H_k P_{k|k-1} H_k^T + R_k)^{-1}, \quad [4]$$

where R is a measurement noise matrix $$R = \begin{bmatrix} r_k & 0 \\ 0 & r_k \end{bmatrix},$$

and H is the observation matrix described below by Equation [10].

State Update

The state update (a posteriori) equation is given by $$\hat{x}_{k|k} = \hat{x}_{k|k-1} + K_k(z_k - H_k \hat{x}_{k|k-1}), \quad [5]$$

where $z_k$ is an observation vector.

Covariance Update

The covariance update (a posteriori) equation is given by:

$$P_{k|k} = (1 - K_k H_k) P_{k|k-1}. \quad [6]$$

In some implementations, the observation vector $z_k$ includes pseudorange measurements, delta pseudorange measurements (e.g., Doppler measurements) and step-based speed measurements. When the step-based speed assistance conditions are met, the extended Kalman filter is updated with GNSS measurements (e.g., pseudorange and Doppler measurements) and the step-based speed measurement using the state update Equation [5]. Additionally, the measurement noise $r_k$ in Equation [4] is set to speedUnc calculated in Equation [1].

In some implementations, the extended Kalman filter estimates three-dimensional velocity in geodetic, local-level coordinates such as East-North-Up (ENU) reference coordinates represented as easting velocity, northing velocity and vertical (up) velocity. In this extended Kalman filter formulation, the step-based speed assistance is a horizontal speed norm pseudo measurement and the observation ($z_k$) is given by $$z_k = \sqrt{v\_e^2 + v\_n^2}, \quad [7]$$

with the measurement uncertainty being speedUnc.

With a point of expansion (v_$e_0$, v_$n_0$), $$z_0 = \sqrt{v\_e_0^2 + v\_n_0^2}, \text{ and} \quad [8]$$

the linearized form (first order Taylor series expansion) used in the extended Kalman update step Equation [5] is given by:

$$z_k - z_0 = dz_k/dv\_e * (v\_e - v\_e_0) + dz_k/dv\_n(v\_n - v\_n_0). \quad [9]$$

The innovation matrix H corresponding to this observation is given by $$H = \begin{bmatrix} \frac{dz_k}{dv\_e}, & \frac{dz_k}{dv\_n} \end{bmatrix} = [v\_e/\sqrt{v\_e^2 + v\_n^2}, v\_n/\sqrt{v\_e^2 + v\_n^2}], \quad [10]$$

with innovation $v = z_k - z_0$.

In some implementations, the observations in H (e.g., pseudorange, delta pseudorange, step-based speed measurement) can be used in the state update Equation [5] in succession or at the same time.

In some implementations, state estimator 102 receives the motion activity classification signal and in response selects one or more BW parameters from database 110 and provides the BW parameter(s) to state estimator 102. Motion activity classifications can include but are not limited to the following motion activities: stationary, walking, running and cycling. Each one of these motion activity classifications can be associated with one or more Kalman filter process noise parameters stored in database 110. In some implementations, the Kalman filter process noise parameters for motion activity classes are used to adapt or replace the process noise parameters in an extended Kalman filter (e.g., default process noise parameters) implemented by state estimator 102. Accordingly, the bandwidth of state estimator 102 can be adjusted whenever a new motion activity classification is detected.

Example Process

Figure 3:
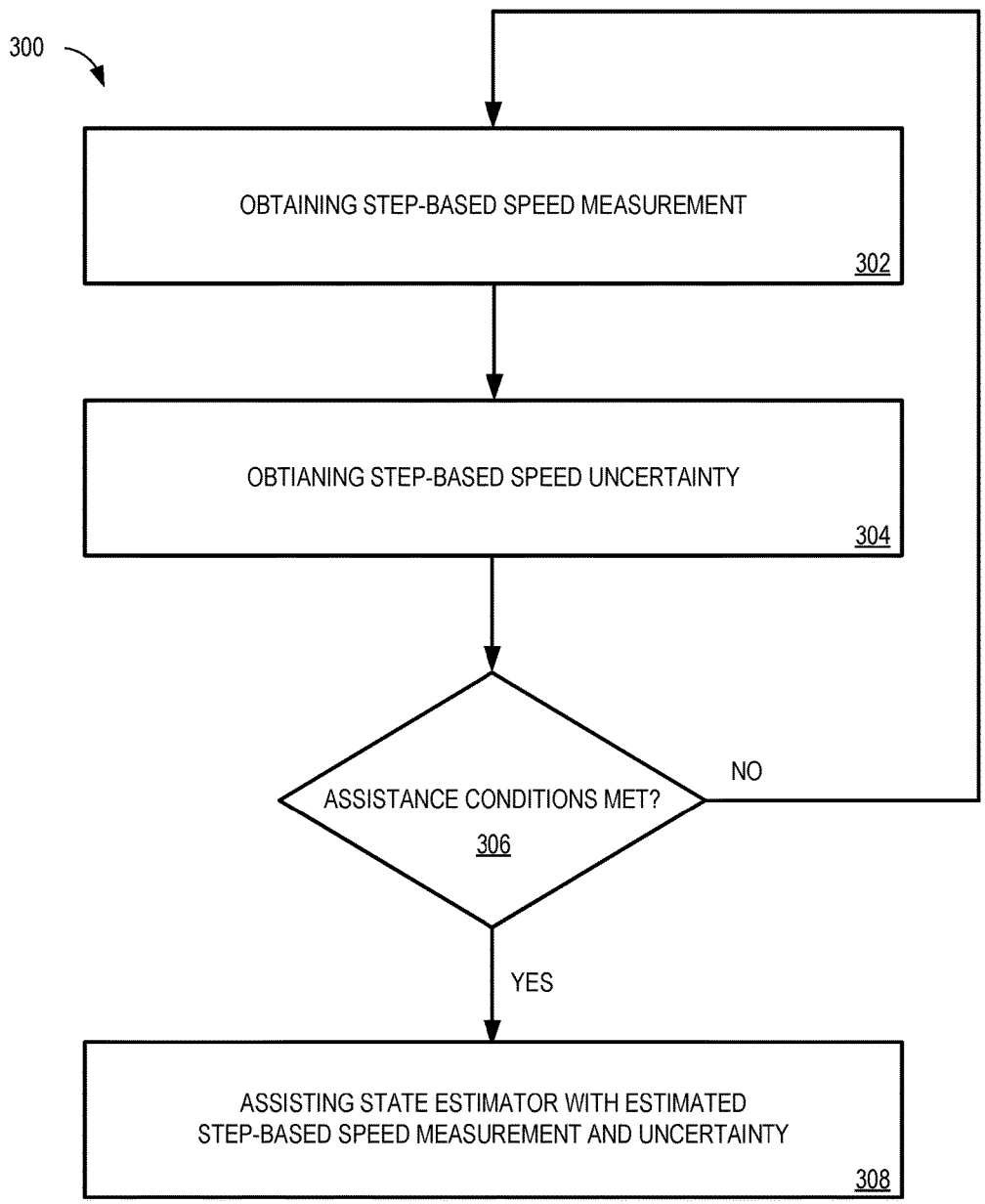
FIG. 3 is a flow diagram of an example process for assisted GNSS velocity estimation, according to an implementation.

FIG. 3 is a flow diagram of an example process 300 for assisted GNSS velocity estimation, according to an implementation. Process 300 can be implemented by mobile device architecture 400, as described in reference to FIG. 4.

In some implementations, process 300 can begin by obtaining a step-based speed measurement (302). For example, the step-based speed measurement can be obtained from a digital pedometer based on a step count derived from sensor data (e.g., accelerometer data).

Process 300 can continue by obtaining a step-based speed uncertainty parameter associated with the step-based speed measurement (304). For example, the step-based speed uncertainty can be derived using Equation [1].

Process 300 can continue by determining if one or more assistance conditions are met (306). For example, pedometer data, sensor data (e.g., barometer data) and prior GNSS position and speed estimates can be used to determine if assistance conditions are met.

Process 300 can continue by assisting a state estimator with the step-based speed measurements and associated step-based speed uncertainty (308). For example, the step-based speed measurement can be used in a Kalman filter state update calculation and the associated step-based speed uncertainty can be used in a Kalman gain calculation.

Process 300 described above improves the functioning of a mobile device processor by providing more accurate estimates of GNSS position and velocity/speed to various applications (e.g., fitness and navigation applications). These improved estimates can be used to improve upon navigation and location service applications, which depend upon accurate position and velocity estimates.

Example Device Architecture

Figure 4:
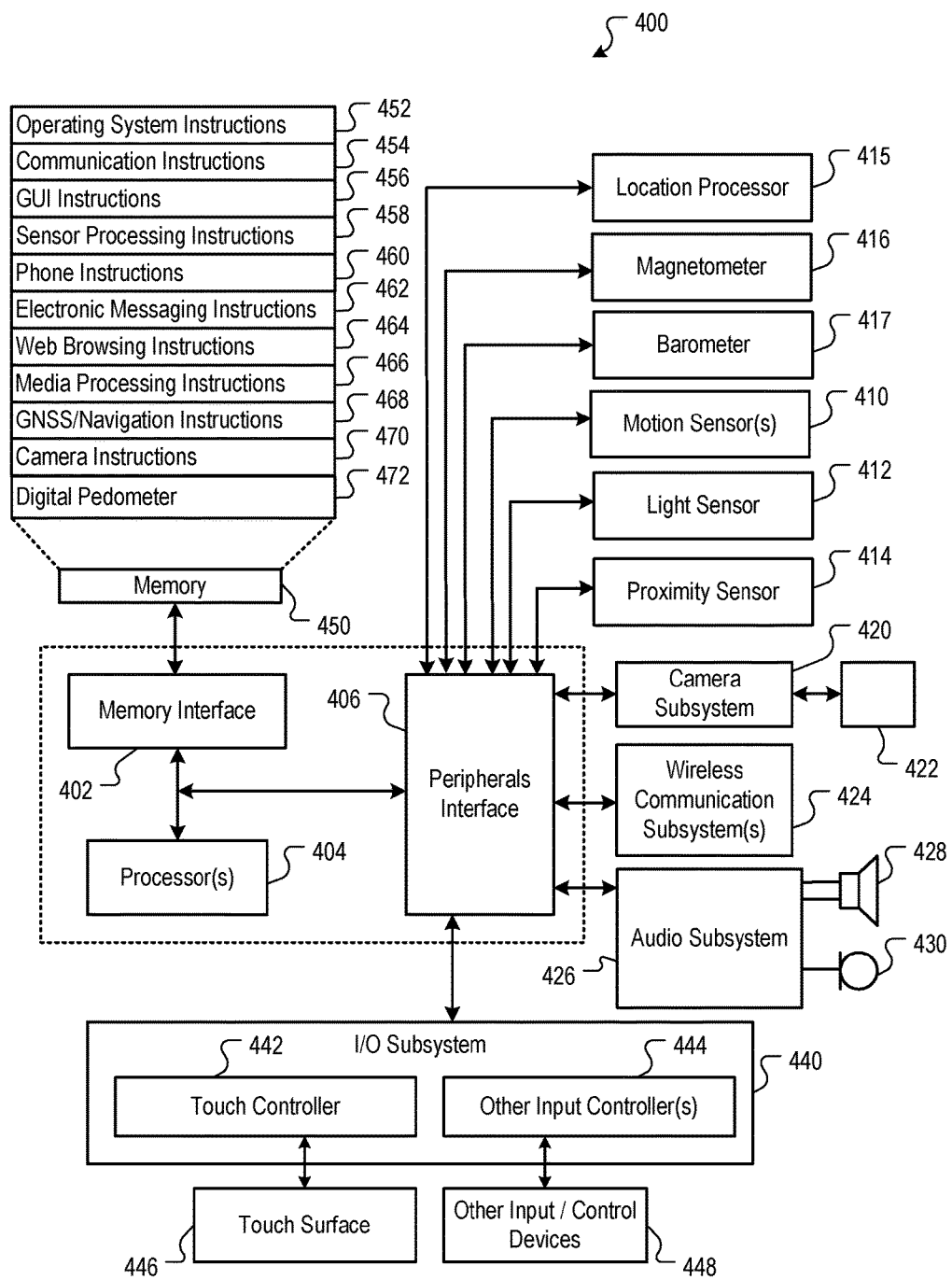
FIG. 4 is a block diagram of example device architecture for implementing the features and processes described in reference to FIGS. 1-3.

FIG. 4 is a block diagram of example device architecture 400 for implementing the features and processes described in reference to FIGS. 1-3. Architecture 400 may be implemented in any mobile device for generating the features and processes described in reference to FIGS. 1-3, including but not limited to smart phones and wearable computers (e.g., smart watches, fitness bands). Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 406, such as a temperature sensor, a barometer, a biometric sensor, or other sensing device, to facilitate related functionalities. For example, a biometric sensor can detect fingerprints and monitor heart rate and other fitness parameters.

Location processor 415 (e.g., GNSS receiver chip) may be connected to peripherals interface 406 to provide geo-referencing. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 424 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, iOS, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications. Communication instructions 454 may also be used to select an operational mode or communication medium for use by the device, based on a geographic location (obtained by the GPS/Navigation instructions 468) of the device.

Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and digital pedometer 472 for providing step-based speed measurements, step count and step frequency, as described in reference to FIGS. 1-3. The GPS/Navigation instructions 468 include instructions for implementing all or parts of system 100, including but not limited to the example extended Kalman filter formulation disclosed herein.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining, by a mobile device, a step-based speed measurement based on sensor data;
   obtaining, by the mobile device, a step-based speed uncertainty associated with the step-based speed measurement;
   evaluating, by the mobile device, a plurality of assistance conditions, each derived from different aspects of the step-based speed measurement;
   determining, by the mobile device, that one or more of the evaluated assistance conditions are met;
   responsive to the determining, assisting a state estimator using the step-based speed measurement and the associated step-based speed uncertainty, wherein the assisting includes using the step-based speed uncertainty in the state estimator as a source of measurement noise; and
   estimating, by the mobile device, at least one of the position, velocity or speed of the mobile device using the assisted state estimator.

2. The method of claim 1, wherein the step-based speed measurement is obtained from a digital pedometer of the mobile device.

3. The method of claim 2, wherein determining that one or more of the evaluated assistance conditions are met further comprises:
   determining, by the mobile device, if a prior GNSS speed estimate is higher than the step-based speed measurement provided by the digital pedometer.

4. The method of claim 2, wherein determining that one or more of the evaluated assistance conditions are met further comprises:
   determining, by the mobile device, if the step-based speed measurement is outside of an acceptable speed for a human who is running.

5. The method of claim 2, wherein determining that one or more of the evaluated assistance conditions are met further comprises:
   determining, by the mobile device, that step counts provided by the digital pedometer occur on a regular interval and a step frequency based on the step counts is relatively constant over a window of step observation time.

6. The method of claim 1, wherein the step-based speed uncertainty is modeled as a quadratic function of the step-based speed.

7. The method of claim 6, wherein the step-based speed uncertainty is given by $$speedUnc = A*(speed_{step} - B)^2 + C,$$

where A, B and C are constants.

8. The method of claim 1, wherein determining that one or more of the evaluated assistance conditions are met further comprises:
   determining, by the mobile device, if the user is running on an incline or decline using a window of sampled barometer data.

9. The method of claim 1, wherein determining that one or more of the evaluated assistance conditions are met further comprises:
   determining, by the mobile device, if a motion activity class signal indicates the user is running.

10. The method of claim 1, wherein determining that one or more of the evaluated assistance conditions are met further comprises:
    determining, by the mobile device, if the user is running in-place based on GNSS position or velocity estimates over a window of step observation time.

11. The method of claim 1, wherein the plurality of assistance conditions includes at least one of step count regularity, step frequency, and inclination or declination of the mobile device.

12. The method of claim 11, wherein the plurality of assistance conditions further includes at least one of step-based speed measurement relative to prior GNSS speed estimate, running motion activity class, step-based speed measurement acceptability, and stationary running.

13. A mobile device comprising:
    one or more sensors;
    one or more processors;
    memory coupled to the one or more processors and configured to store instructions, which, when executed by the one or more processors, causes the one or more processors to perform operations comprising:
       obtaining a step-based speed measurement based on sensor data;
       obtaining a step-based speed uncertainty associated with the step-based speed measurement;
       evaluating a plurality of assistance conditions, each derived from different aspects of the step-based speed measurement;
       determining that one or more of the evaluated assistance conditions are met;
       responsive to the determining, assisting a state estimator using the step-based speed measurement and the associated step-based speed uncertainty, wherein the assisting includes using the step-based speed uncertainty in the state estimator as a source of measurement noise; and
       estimating at least one of the position, velocity or speed of the mobile device using the assisted state estimator.

14. The mobile device of claim 13, wherein the step-based speed measurement is generated by a digital pedometer of the mobile device.

15. The mobile device of claim 14, wherein determining that one or more of the evaluated assistance conditions are met further comprises:
    determining if a prior GNSS speed estimate is higher than the step-based speed measurement provided by the digital pedometer.

16. The mobile device of claim 14, wherein determining that one or more of the evaluated assistance conditions are met further comprises:
    determining if the step-based speed measurement is outside of an acceptable speed for a human who is running.

17. The mobile device of claim 14, wherein determining that one or more of the evaluated assistance conditions are met further comprises:
    determining that step counts provided by the digital pedometer occur on a regular interval and a step frequency based on the step counts is relatively constant over a window of step observation time.

18. The mobile device of claim 13, wherein the step-based speed uncertainty is modeled as a quadratic function of the step-based speed.

19. The mobile device of claim 18, wherein the step-based speed uncertainty is given by $$speedUnc = A*(speed_{step} - B)^2 + C,$$

where A, B and C are constants.

20. The mobile device of claim 13, wherein determining that one or more of the evaluated assistance conditions are met further comprises:
determining if the user is running on an incline or decline using a window of sampled barometer data.

21. The mobile device of claim 13, wherein determining that one or more of the evaluated assistance conditions are met further comprises:
determining if a motion activity class signal indicates the user is running.

22. The mobile device of claim 13, wherein determining that one or more of the evaluated assistance conditions are met further comprises:
determining if the user is running in-place based on the GNSS position or velocity estimates over a window of step observation time.

23. The mobile device of claim 13, wherein the plurality of assistance conditions includes at least one of step count regularity, step frequency, and inclination or declination of the mobile device.

24. The mobile device of claim 23, wherein the plurality of assistance conditions further includes at least one of step-based speed measurement relative to prior GNSS speed estimate, running motion activity class, step-based speed measurement acceptability, and stationary running.

* * * * *